US007668942B2

(12) United States Patent  (10) Patent No.: US 7,668,942 B2
Tiwari et al.  (45) Date of Patent: Feb. 23, 2010

(54) GENERATING DOCUMENT TEMPLATES THAT ARE ROBUST TO STRUCTURAL VARIATIONS

(75) Inventors: Charu Tiwari, Madhya Pradesh (IN); V. G. Vinod Vydiswaran, Maharashtra (IN)

(73) Assignee: Yahoo! Inc., Sunnyvale, CA (US)

( * ) Notice: Subject to any disclaimer, the term of this patent is extended or adjusted under 35 U.S.C. 154(b) by 98 days.

(21) Appl. No.: 12/114,568

(22) Filed: May 2, 2008

(65) Prior Publication Data

US 2009/0276506 A1  Nov. 5, 2009

(51) Int. Cl.
 *G06F 15/16* (2006.01)
(52) U.S. Cl. .............................. 709/220; 707/6; 707/100
(58) Field of Classification Search ......... 709/200–202, 709/220; 707/6, 100
See application file for complete search history.

(56) References Cited

U.S. PATENT DOCUMENTS

| 2008/0010291 | A1 | 1/2008 | Poola et al. |
| 2008/0010292 | A1 | 1/2008 | Poola |
| 2008/0046441 | A1* | 2/2008 | Wen et al. ................... 707/100 |
| 2008/0072140 | A1 | 3/2008 | Vydiswaran et al. |

OTHER PUBLICATIONS

Park, Justin et al. "Adaptive Record Extraction From Web Pages," May 8-12, 2007, Alberta, Canada, 2 pgs.
U.S. Appl. No. 11/838,351, filed Aug. 14, 2007 entitled "A Method for Organizing Structurally Similar Web Pages From A Web Site," 36 pgs.

* cited by examiner

*Primary Examiner*—Moustafa M Meky
(74) *Attorney, Agent, or Firm*—Darby & Darby P.C.; David W. Foster

(57) ABSTRACT

A template or wrapper tree for a document such as a web page is generalized from the bottom up (from leaf toward root of a logical tree structure of the template). At a given level in the tree, sub-trees are clustered and the clustered sub-trees are generalized, and the process is repeated at a next higher level in the tree, resulting in a generalized template or wrapper tree. This can be done by generating a nested pattern regular expression based on the sub-tree clusters, merging sub-trees based on the nested pattern regular expression, and then replacing sub-trees in a tree-based regular expression of the template or wrapper at the given level with the merged sub-trees. This process is repeated at a next higher level of the tree (progressing from leaf towards root) until the wrapper or tree-based regular expression that represents the template is fully generalized.

20 Claims, 7 Drawing Sheets

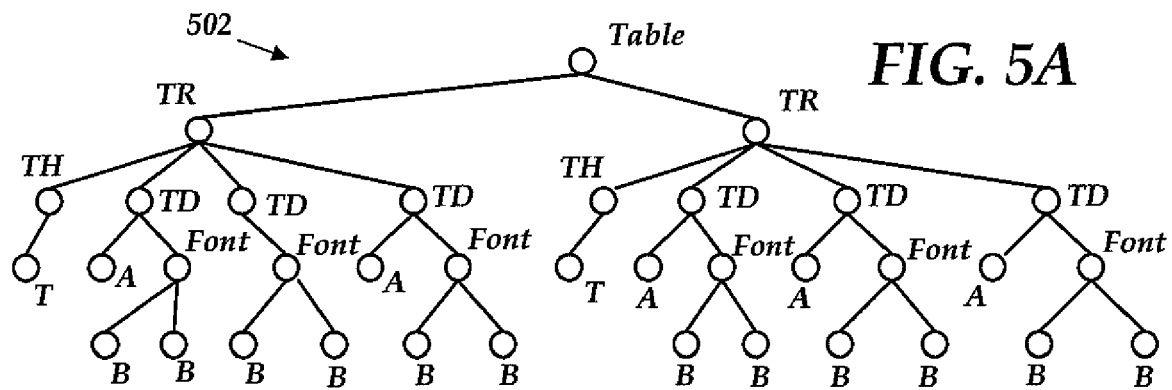
*FIG. 5A*
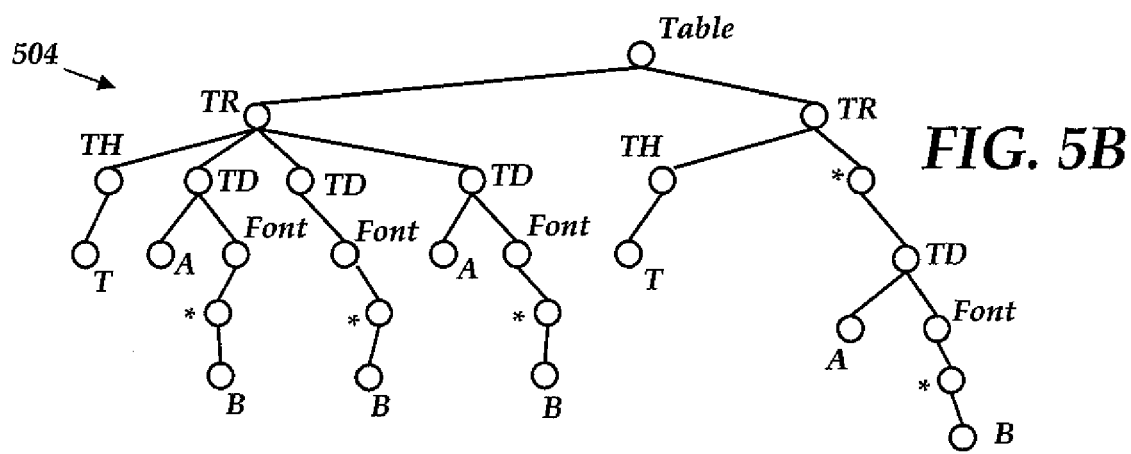
*FIG. 5B*
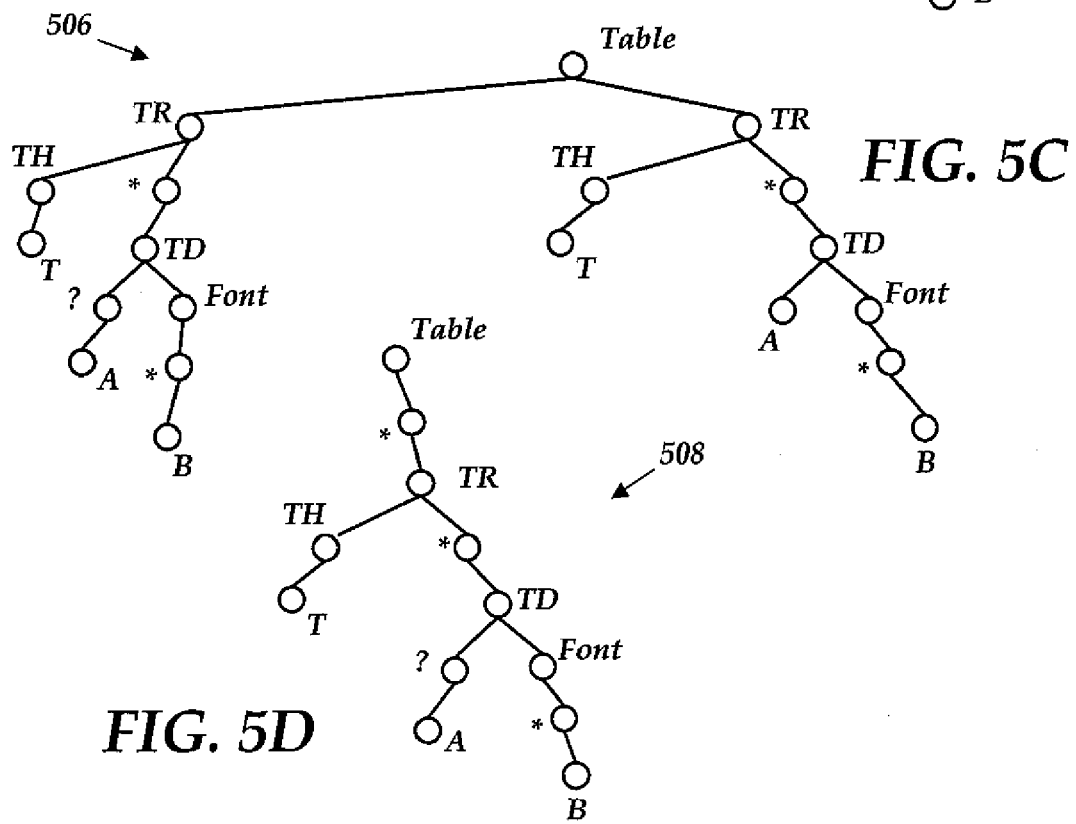
*FIG. 5C*
*FIG. 5D*

GENERATING DOCUMENT TEMPLATES THAT ARE ROBUST TO STRUCTURAL VARIATIONS

TECHNICAL FIELD

The present invention relates generally to generating and managing document templates that can be used to automatically extract information from web pages.

BACKGROUND

The Internet hosts a plethora of web portals in diverse fields like e-commerce, boarding & lodging, and entertainment. Information on websites or web pages of such portals is often presented in a uniform format to give a uniform look and feel, or appeal, to the pages. This can be achieved by using scripts to generate the static content and logical structure (referred to as a template) of the pages, and a database to provide the dynamic content, such as pricing of products. Precise detection of the template can therefore be important for applications that automatically extract information from such sites or sources.

The template detection task can become more challenging when multiple entities like products and search results are presented in the form of records on a single page. If the structure of the records is strictly-continuous, i.e. information in every record is similarly formatted, existing nested pattern detection algorithms can suffice to extract precise information. However, the records do not always follow a strict structure/pattern, hence requiring the template detection mechanism to detect approximate patterns. This is because, although the structure of different records can be largely similar, their information maybe formatted slightly differently. For example, a product description in one record can be in plain text, while in another record the product description can have formatting tags like <B> and <I>. Further, optional information like presence of discount price in addition to the original price, or absence of a rating-image in a record where rating information was not available, can contribute to structural differences between two records within the same page. These factors, if not accounted for, can lead to ineffective, inefficient or low-recall extraction when attempting to extract multiple entities from a page. Accordingly, effectively detecting approximate patterns can be useful to enable generation of a more precise template.

Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 5A-D illustrate example interim results of a process in accordance with the invention.

DETAILED DESCRIPTION

Figure 1:
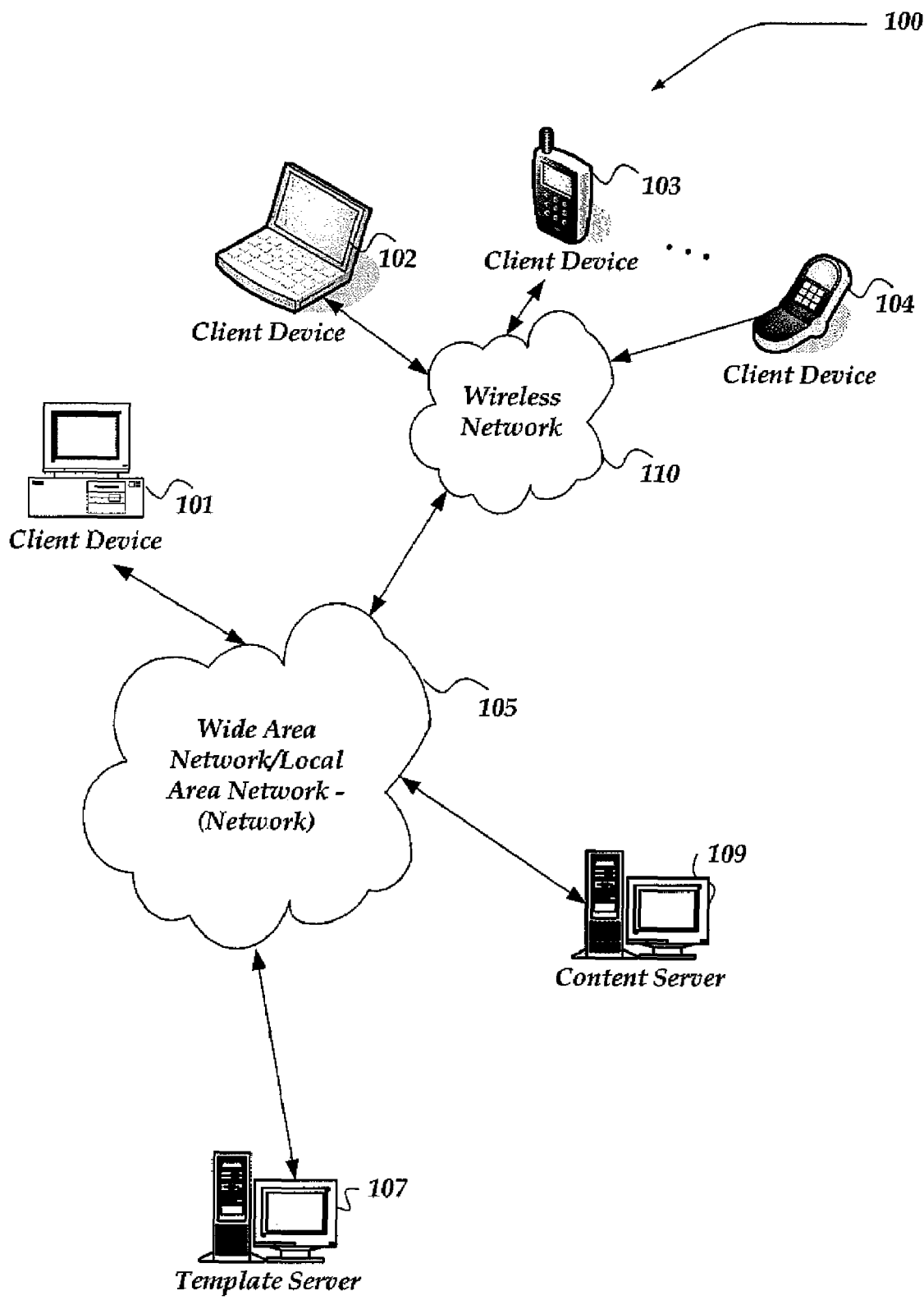
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

A template or logical structure of a web page can be represented in a form consistent with a Document Object Model (DOM), e.g., a platform- and language-independent standard object model for representing HTML (HyperText Markup Language) or XML (eXtensible Markup Language) and related or other formats. The template representation can for example conform to the W3C DOM standard, or another DOM standard. A "wrapper" as used or described herein can be a tree-based regular expression that represents the template, for example where each node in the wrapper can correspond to some node(s) of the DOM template from which it is built.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, example embodiments are directed toward a method for finding approximate repeating patterns within a webpage or other document, and generating a precise but generalized template that represents the web page. The method can work on top of (or using as a first input) an initial wrapper formed by another mechanism, such as top-down nested pattern discovery or other mechanism or method.

In example embodiments, a generalized wrapper is formed by processing an initial wrapper or document from the bottom up, e.g. from the leaf level of a tree that corresponds to the document or web page, to a root of the tree.

At each level in the tree, similar wrapper sibling-sub-trees are clustered together and then string pattern detection is used on the clustered sub-trees to generate a generalized regular expression for the sub trees at that level. Then, the process is repeated at the next higher level in the tree. Thus in an example embodiment an upper level sub-tree is generalized only after all its child sub-trees have been generalized.

The resulting generalized regular expression for the tree can effectively and accurately model record variations within the corresponding web page, and can result in a better generalized wrapper. A better first-page wrapper can also result in better generalization when the wrapper or template is generalized to additionally cover or model other (e.g., similar) web pages. This can be particularly useful when processing multi-entity web pages.

In an example embodiment, a generalized template or logical structure for a document such as a web page or other document is formed first by receiving a tree-based regular expression that represents the template. Then, sub-trees at a given level in the tree are clustered. The sub-trees include for example nodes at the given level, and nodes below them including leaf nodes. The clustering can be performed by selecting sub-trees to cluster using a cost measure that indicates a degree of similarity or a cost of differences between a sub-tree and a cluster. The clustered sub-trees are then represented in a string of character symbols, wherein each cluster is uniquely labeled with a character symbol, and instances of character symbols in the string represent sub-trees that are members of the corresponding cluster. For example, a string ABABABACAC can represent ten sub-trees variously corresponding to clusters A, B, C. The string is then used to generate a nested pattern regular expression, e.g. (AB)* (AC)* where the "*" or STAR operator indicates one or more instances or occurrences. The sub-trees are also mapped to the character symbols in the nested pattern regular expression. Thus when multiple sub-trees are represented by a character symbol in the nested pattern regular expression, the mapping can indicate which of the sub-trees correspond to the character symbol. Then, a tree is generated from the nested pattern regular expression, and each character symbol in the generated tree is replaced with a merge of the sub-trees that map to that character symbol, to form a generalized regular expression tree representing the sub-trees at the given level. Next, the generalized regular expression tree is used to replace the corresponding sub-trees in the tree-based regular expression (that represents the wrapper tree or template of the document or web page that is being generalized), to thus generalize it. This process is then repeated at a next higher level in the tree-based regular expression until the whole template or wrapper tree is generalized.

In an example embodiment the cost measure that is used to cluster sub-trees, indicates a cost of a node where the cost is based (in whole or in part) on a level of that node in the tree that represents the template, e.g., the tree-based regular expression.

In an example embodiment, the cost of a node (e.g., as indicated by the cost measure) increases with a proximity of the node to a root of the tree-based regular expression, or a root of the tree that represents the document template.

In an example embodiment, a sub-tree is added to or associated with a cluster, by comparing the sub-tree with each cluster (or computing a cost for each cluster of adding the sub-tree to that cluster or generalizing the cluster to cover the sub-tree) and then selecting the cluster that is most similar, or least expensive, and also has a computed cost that is below a threshold. If the cost measure for each cluster with respect to the sub-tree exceeds the threshold, then a new cluster is formed based on the sub-tree.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, a Social Network server 107, and a Content server 109.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), Internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device or network, such as a social network or other resource accessible through a server such as one of the servers 107, 109. Such a user account for example, may be configured to enable the user to receive emails, send/receive IM messages, SMS messages, access selected web pages, participate in a social networking activity, provide messages that may include links or attachments, or the like. However, managing of messages may also be performed without logging into the user account.

A message may be sent using any of a variety of message protocols, including but not limited to SMS, IM, MMS, email, or the like. The recipient of message has the option of responding to the message either by addressing the response to only the sender, addressing the response to all of the recipients along with the sender or selecting particular recipients. The recipient can also forward the email onto others, either directly or through the auspices of a structured social network, for example Yahoo 360 or Facebook or the like. The forwarded message may include a reference to the content, article, or message using, for example, an attachment, a link, a copy of the content, article, or message within the forwarded message, or virtually any other mechanism.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple the Template Server 107 and the Content server 109 with each other and with other computing devices, including but not limited to client device 101, and through wireless network 110 to client devices 102-104. For example, an individual user can use one of the devices 101-105 to contact one or more of the servers 107, 109. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

It should be noted that in example embodiments, the client devices 101-104 may also be configured to variously take on some or all of the functions and responsibilities described herein with respect to the servers 107, 109. Moreover, in another embodiment various functions performed by the servers 107, 109 may be distributed across a plurality of network devices or client devices.

An example embodiment of the servers 107, 109 is described in more detail below in conjunction with FIG. 3. Generally, however, the server 107 and optionally the server 109 may include any computing device capable of connecting to network 105 to enable generalization of templates corresponding to electronic documents such as web pages and the like, and gathering or collection of information to support template generalization, and store or provide access to generalized templates.

In an example embodiment, the template server 107 is configured to generalize templates corresponding to electronic documents such as web pages and the like, and can also be configured to gather or collect information to support template generalization. For example, the server 107 can include or enable a web crawler that searches the Internet to visit web pages (e.g. on the content server 109 or elsewhere, even content hosted on the server 107) and collect information that can be used to form a template or structure of electronic documents that the web pages represent. The server 107 can be configured to provide the template to an application (e.g. provided by or through the server 107) to generalize the template. The generalized template can be stored at the server 107 or elsewhere, for example in one or more of the client devices 101-104 and/or the content server 109.

Devices that can operate as one or more of the template server 107 and the content server 109 may include, but are not limited to personal computers, desktop computers, multiprocessor systems, microprocessor-based or programmable consumer electronics, network PCs, servers, network appliances, and the like. Moreover, while the servers 107, 109 are illustrated as distinct devices, the invention is not so limited. For example, in one embodiment, the servers 107, 109 may be implemented within a single network device, or distributed across a plurality of network devices.

The servers 107, 109 can include virtually any network computing device that is configured to provide various resources, including content and/or services over network 105. One or more of the servers 107, 109 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through servers 107, 109 (subject to applicable access conditions or restrictions) for access by client devices 101-104. In one embodiment, the servers 107, 109 might be configured and arranged to provide a website for users to post, view, link to, and/or otherwise access, content. Servers 107, 109 might also provide FTP services, APIs, web services, database services, or the like, to enable users to access content. In addition, one or more of the servers 107, 109 may also provide a messaging service, such as an email server, text messaging server, or the like. However, the servers 107, 109 are not limited to these mechanisms, and/or content, and others are envisaged as well.

Illustrative Client Environment

Figure 2:
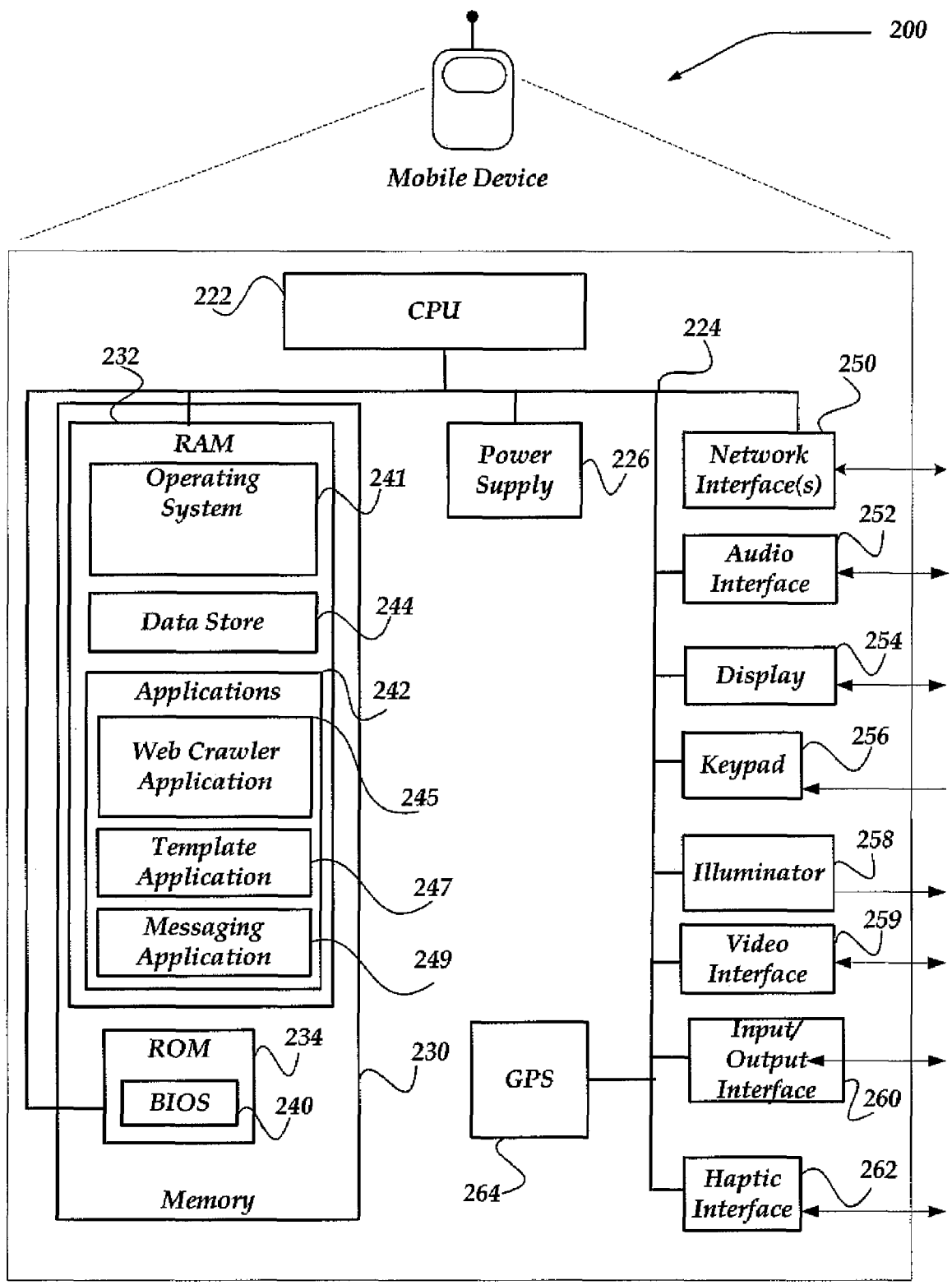
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in FIG. 1, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Y! GO. The operating system may include, or interface with a Java virtual machine module that enables control of hardware components and/or operating system operations via Java application programs.

Memory 230 further includes one or more data store(s) 244, which can be utilized by mobile device 200 to store, among other things, applications 242 and/or other data. For example, a data store 244 may also be employed to store information that describes various capabilities of mobile device 200. The information may then be provided to another device based on any of a variety of events, including being sent as part of a header during a communication, sent upon request, or the like. Moreover, data store 244 may also be employed to store personal information including but not limited to address lists, contact lists, personal preferences, or the like. Data store 244 may also include profile information. In an example embodiment, the data store 244 includes template information, including but not limited to generalized templates that correspond to electronic documents such as web pages or other documents. At least a portion of information in the data store 244 may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. These applications variously enable the mobile device 200 to communicate with networks, websites and other devices, for example any of the servers 107, 109.

The applications 242 can include a template application 247 that enables the mobile device 200 to receive template or wrapper information, generate templates or wrappers, and generalize templates or wrappers, for example electronic document templates or wrappers in the form of, or corresponding to, a tree-based regular expression. The applications 242 can also include a web crawler application 245 configured to search or crawl (in a directed or undirected fashion) websites accessible too the mobile device 200, e.g. through the wireless network 110, and collect document information from web pages or other information sources, for example document information that is or corresponds to a template or logical structure of the corresponding document.

The applications 242 can also include a messaging application 249 that can enable or include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed. The messaging application 249 can be configured to send, to receive, and/or to otherwise process messages using SMS, MMS, IM, email, VOIP, and/or any of a variety of other messaging communication protocols, and can work in conjunction with the social network application 245 in situations where the application 245 is provided and enabled.

Illustrative Network Device Environment

Figure 3:
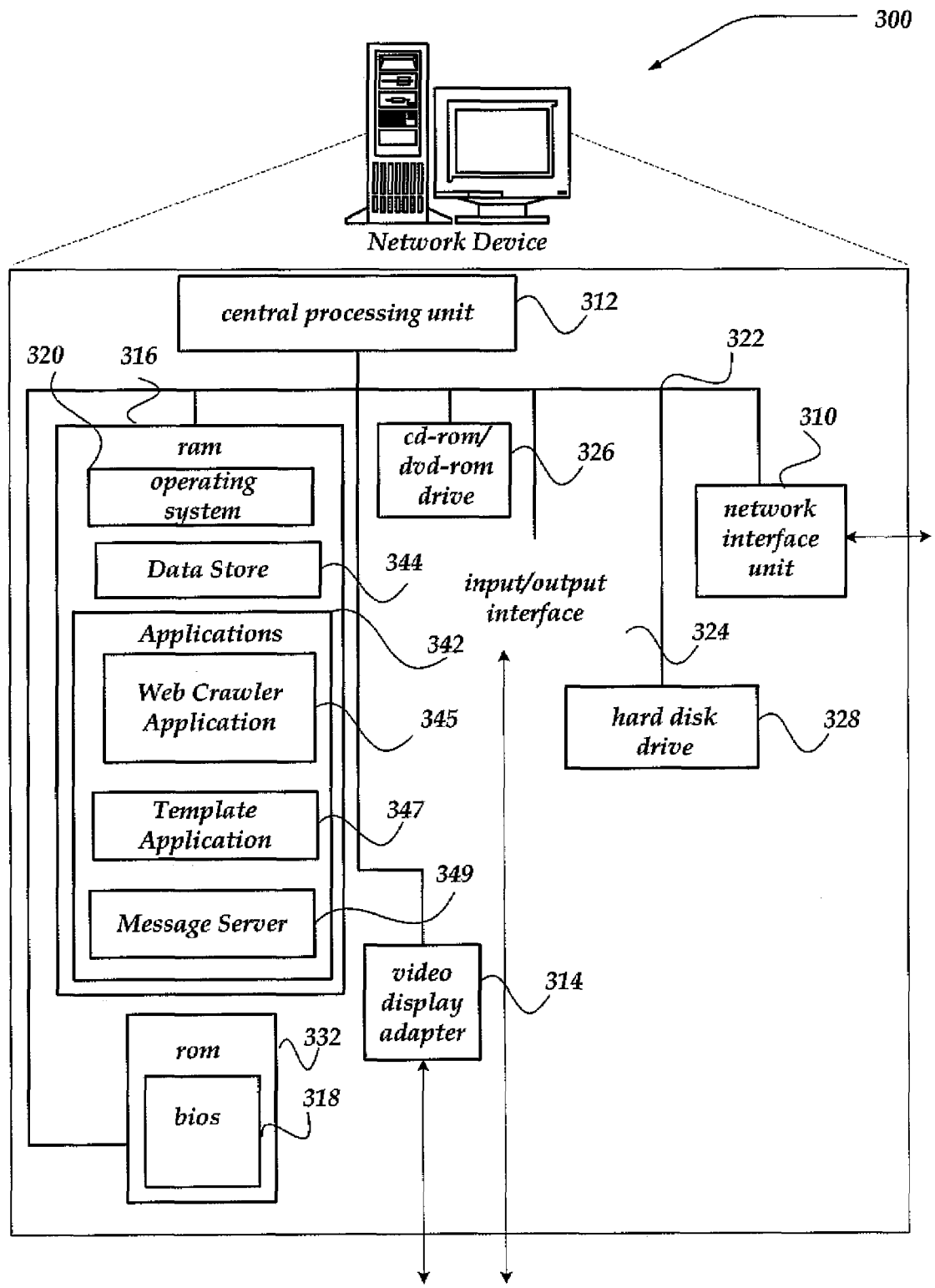
FIG. 3 shows one embodiment of a network device that may be included in a system implementing the invention.

FIG. 3 shows one embodiment of a network device, according to one embodiment of the invention. Network device 300 may include more components than those shown. The components shown, however, are sufficient to disclose an illustrative embodiment for practicing the invention. Network device 300 may represent, for example, one or more of the servers 107, 109 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 342 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth.

Applications 342 may include a template application 347 that enables the network device 300 to receive template or wrapper information, generate templates or wrappers, and generalize templates or wrappers, for example electronic document templates or wrappers in the form of, or corresponding to, a tree-based regular expression. The applications 342 can also include a web crawler application 345 configured to search or crawl (in a directed or undirected fashion) websites accessible too the network device 300, e.g. via the network 105, and collect document information from web pages or other information sources, for example document information that is or corresponds to a template or logical structure of the corresponding document. The template application 347 can, for example, perform or enable features described for example further below in the Generalized Operation section and elsewhere herein.

Applications 342 can also include a message server 349 can field messages from other entities such as individual users or other networks or servers, and may include virtually any computing component or components configured and arranged to forward messages from message user agents, and/or other message servers, or to deliver messages to a local message store, such as data store 344, or the like. Thus, message server 349 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. However, message server 349 is not constrained to email messages, and other messaging protocols may also be managed by one or more components of message server 349. Thus, message server 349 may also be configured to manage SMS messages, IM, MMS, IRC, mIRC, or any of a variety of other message types. Moreover message server 349 may also represent a web server configured to enable access to and/or management of messages. The message server 349 can communicate appropriately with the other applications, for example the applications 345, 347, for example to exchange messages or information.

Generalized Operation

Figure 4A:
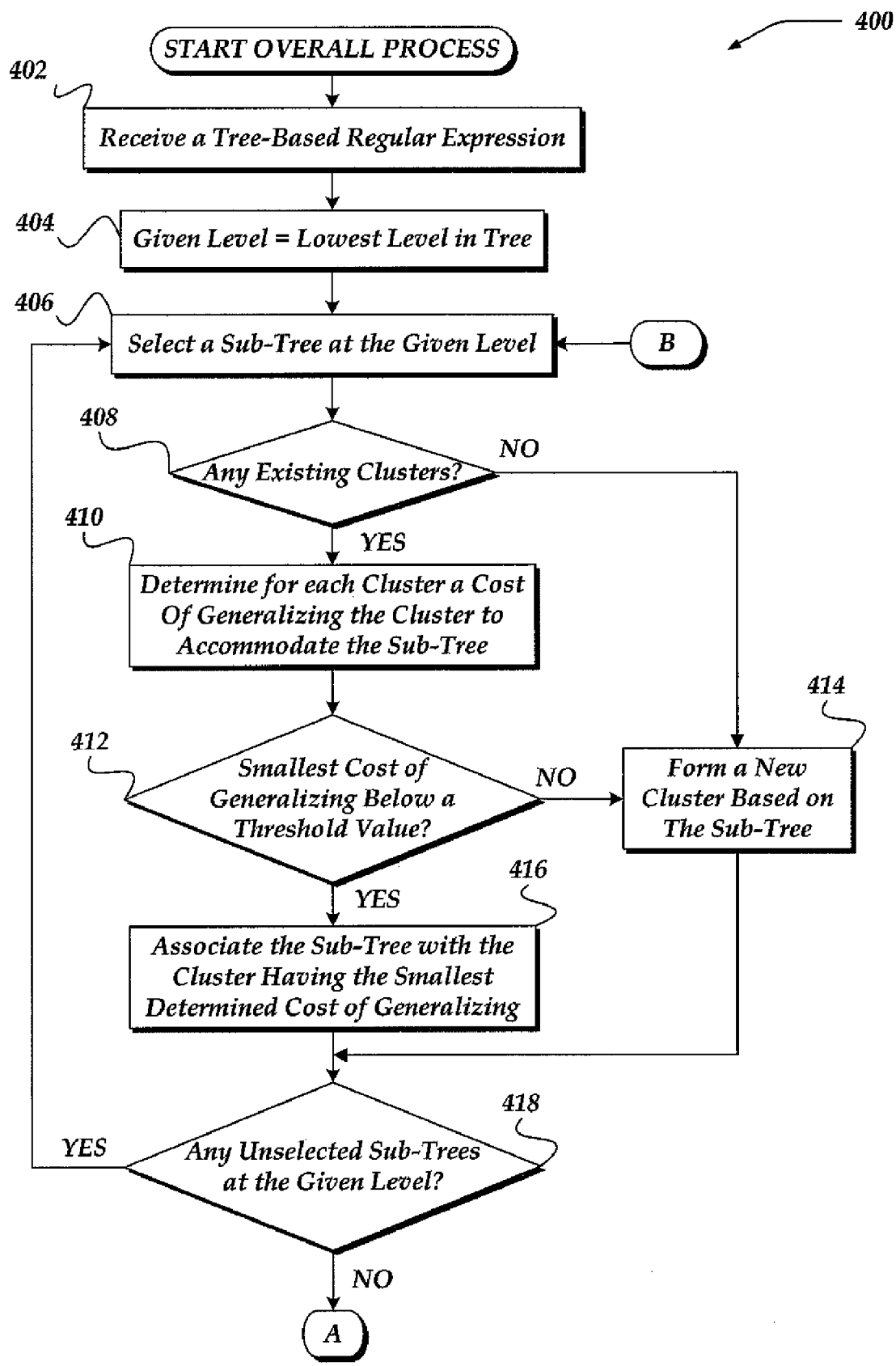
FIGS. 4A, B illustrate a logical flow diagram showing an embodiment of a process in accordance with the invention.
Figure 4B:
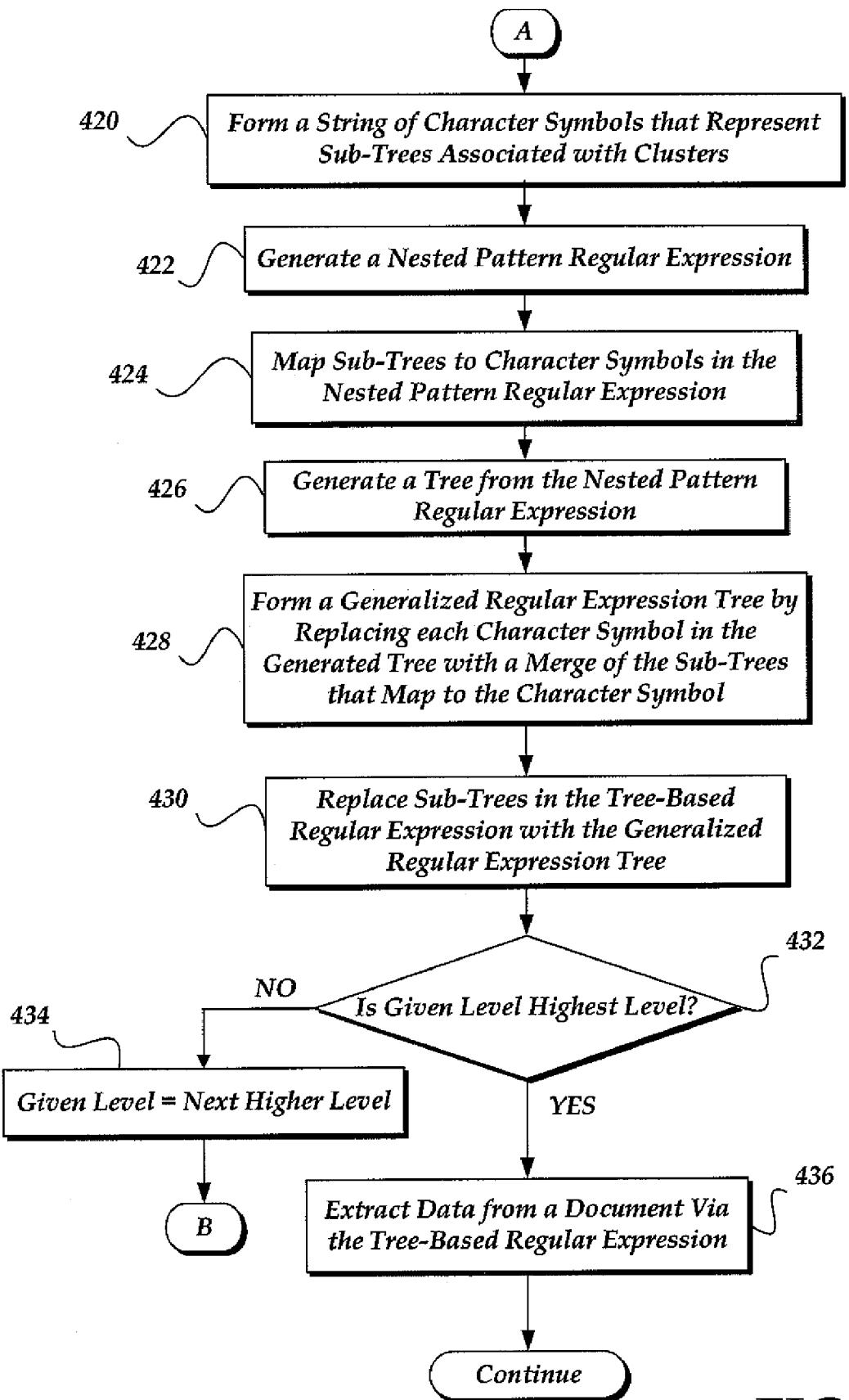

FIGS. 4A-B illustrate an example process for generalizing a document template such as a template for a web page or other document from the bottom up (from leaf toward root), in accordance with example embodiments of the invention. Generally, blocks 406-418 illustrate an example sub-process for clustering sub-trees at a given level of a tree-based regular expression or wrapper that represents the template or logical structure of the document. Blocks 420-430 illustrate an example sub-process for generalizing the clustered sub-trees and then inserting those generalizations back into the template, for example by generating a nested pattern regular expression based on the clusters, merging sub-trees based on the nested pattern regular expression, and then replacing sub-trees in the tree-based regular expression or wrapper at the given level with the merged sub-trees. Then, these sub-processes are repeated at a next higher level of the tree (progressing from leaf towards root), and so forth until the wrapper or tree-based regular expression that represents the template is fully generalized, e.g. to an extent possible.

Specifically, FIG. 4A begins at block 402, where a tree-based regular expression or wrapper that represents an initial template of an electronic document, is received. The document can, for example, be a web page.

The tree-based regular expression received in block 402 can, for example, be generated by the same entity that applies techniques in accordance with the invention to generalize the template, or can be provided by another entity. The initial tree-based regular expression can, for example, be constructed or obtained in a variety of ways, including for example receiving the document in an HTML format that is consistent with a Document Object Model (DOM) standard, and then changing the document into a string where each HTML tag is mapped to a unique character and all text nodes in the document are replaced by (or represented in the string with) single characters. A top-down (e.g. from root toward leaf) nested pattern discovery approach or other algorithm can then be applied to the string to form the initial tree-based regular expression or wrapper, wherein each node in the wrapper corresponds to some node(s) in the DOM from which the wrapper is built. The node(s) in the DOM for each node in the wrapper can be referred to as a representative DOM set for the wrapper node.

Since the process works from the bottom up (from leaf towards root), control proceeds from block 402 to block 404, wherein a given level is set initially to be a lowest level of the wrapper or tree-based regular expression that is to be generalized.

Control from block 404 to block 406, where a sub-tree at the given level is selected. Control then proceeds to block 408, where a determination is made, whether there are any existing clusters. If no, then control proceeds to block 414 where the selected sub-tree is used to form a new cluster, after which control proceeds to block 418. If in block 408 the determination is yes, then control proceeds to block 410, where for each cluster, a cost of generalizing the cluster to cover or accommodate the selected sub-tree is determined. A lower cost indicates a greater similarity between the selected sub-tree and the cluster, thus the lower the cost, the greater the similarity. From block 410 control proceeds to block 412, where a determination is made as to whether the smallest cost determined in block 410, is below a threshold value.

This threshold value applied in block 412 can, for example, be based on a total cost of the wrapper, and can for example be a percentage of the total wrapper cost. The threshold specifies a maximum acceptable cost of modifying or generalizing the cluster to accommodate or encompass the sub-tree, or in other words requires a minimum degree of similarity between sub-tree and cluster, the lower the threshold the greater the required similarity. Threshold values can be selected in an empirical fashion, for example by applying example embodiments of the invention to one or more test wrappers with different threshold values and then comparing results to select one of the threshold values for use in ongoing operations. In one embodiment, the threshold is a constant value. In another embodiment, the threshold value varies with or depends on the given level of the tree for which sub-trees are being evaluated and generalized. For example, in one embodiment the threshold value decreases (becomes more strict) as the given level approaches the root of the wrapper tree or template. In another embodiment, the threshold value can increase (or become less strict) as the given level approaches the root of the wrapper tree or template.

In an example embodiment, a cost of the wrapper tree can be computed by traversing the wrapper tree and computing the cost of all children nodes and returning the total sum cost. For example, the total sum cost of a tree (or sub-tree) rooted by a node=cost of the node+sum of costs returned by all child sub-trees of the node. OR, HOOK, and STAR nodes or operators have no cost of themselves. For example, if a node is an OR node (e.g. represented in the tree with a symbol "|") that indicates that one and only one of its children must be used, the OR node does not itself add any cost and the cost computed for it is simply the maximum cost of its children. For example, if an OR node has two children and the cost of one child is 2 and the cost of the other child is 3, then the computed cost of this OR node would be 3. If the node is a HOOK node (e.g. represented in the tree with a symbol "?") that indicates that its child or children are optional, then the computed cost of this hook node is simply the sum cost of its children. In an example embodiment, a HOOK node will always have only one child, although it may have multiple grandchildren. Like the OR node, a HOOK node has no cost of itself. If the node is a STAR node (e.g. represented in the tree with a symbol "*") that indicates that its child or children occur at least once and may occur more than once, then the computed cost of this node is simply the sum cost of its children (counted as occurring once). Like the OR and HOOK nodes, the STAR node has no cost of itself. Other nodes have a cost of themselves, which in an example embodiment is calculated using a formula that accounts for a level of the node in the wrapper tree. An example embodiment uses a formula $C=K^{(1-(L/H))}$ where, for example, C is a computed cost of a node, K is a constant such as 5, L is a level of the node in the wrapper tree (where the root node has a level value of 1 and levels below it have sequentially higher values), and H is a static height of the wrapper tree. In an example embodiment, if at any point L exceeds H, H can be modified to equal L. Other formulas or cost measures can used to compute the cost of a node, for example that take into account or vary with a level of the node in the wrapper tree, or alternatively, that do not. In an example embodiment the cost of generalizing or matching, for example the cost of generalizing a cluster to accommodate or encompass a sub-tree (e.g. as computed or determined in block 410), is computed in similar fashion to that of calculating a cost of an entire wrapper tree, except that rather than applying the cost measure to every node, the cost measure is applied only to those nodes of a cluster that would have to be modified to accommodate the sub-tree.

Returning now to FIG. 4A, if in block 412 the smallest cost is not below the threshold value, or in other words if each of the clusters is too expensive to modify, then control proceeds to block 414, where the selected sub-tree is used to form a new cluster, If in block 412 the determination is yes, that the smallest cost of generalizing one of the clusters is below the threshold, then control proceeds to block 416 where the sub-tree is associated with that cluster that has the smallest determined cost of generalizing, or in other words, the cluster that is least expensive to modify to cover the sub-tree. Control then proceeds from block 416 to block 418, where a determination is made whether there are any sub-trees at the given level that have not yet been selected and compared against the clusters. If yes, then control returns to block 406, where a next sub-tree is selected. If no, then control proceeds from block 418 to block 420 (shown in FIG. 4B) where a string is formed of character symbols that represent sub-trees associated with clusters. An example string might be ABABABACAC which indicates that ten sub-trees in a particular order are variously associated with (e.g. belong to) three clusters A, B, C.

Control proceeds from block 420 to block 422 where a nested pattern regular expression is generated based on the string of block 420. Any nested string pattern generation algorithm can be used, for example approximate nested pattern generation, or another algorithm. For example, by generating a suffix tree for the sequence of characters in the string, identifying valid patterns, generating a regular expression (which includes replacing multiple occurrences of a pattern with an equivalent regular expression, such as a starred-single occurrence), forming a new string, then repeating these steps until no more patterns are available. (Note that this algorithm can also be applied to create an initial template or wrapper, by first encoding a web page such as an HTML page to form a string of characters and then applying the algorithm to the string).

Control then proceeds from block 422 to block 424, where sub-trees are mapped to character symbols in the nested pattern regular expression. This mapping can for example be useful where a multiple occurrences of a cluster (or rather of sub-trees corresponding to a particular cluster) appear in the nested pattern regular expression. For example, where the string ABABABACAC resolves to a nested pattern regular expression (AB)*(AC)*, knowing which sub-trees correspond to which occurrences of A in the expression can enable accurate generalization of the wrapper tree. In an example embodiment, the actions of block 424 can take place concurrently or in coordination with those of block 422.

Control proceeds from block 424 to block 426, where a tree (e.g. a regular expression tree) is generated or assembled based on the nested pattern regular expression of block 424. Control proceeds from lock 426 to block 428, where a generalized regular expression tree is generated or formed by replacing each character symbol (e.g. that represents or identifies a particular cluster) in the tree formed in block 426 with a merge of the sub-trees that map to that character symbol (e.g. as indicated by the map formed in block 424). Control then proceeds from block 428 to block 430, where sub-trees in the tree-based regular expression of block 402 (e.g., the wrapper tree or document template that is being generalized) are replaced with the generalized regular expression tree of block 428, at the current given level of the wrapper tree (recall, e.g., blocks 404, 406). Control then proceeds from block 430 to block 432, where a determination is made, whether there are higher levels in the wrapper tree at which to repeat this generalization process. If the current, given level is not the highest level in the wrapper tree, then control proceeds to block 434 where the given level is set to the next higher level, and from there returns to block 406 to apply repeat the process at or for this new, or next higher level. If in block 432 it is determined that the current, given level is the highest level of the wrapper tree or there are no higher levels to evaluate, then control proceeds to block 436, where the resulting wrapper tree or generalized template can be used to extract data from document such as a web page. From block 436 the process ends or otherwise continues, for example the extracted data can be stored and/or displayed to a user, and the generalized wrapper tree can be likewise stored.

It will be understood that the actions shown in FIGS. 4A-B can be performed in different orders than those shown, and can be variously combined or modified by adding other actions or selectively omitting illustrated actions in accordance with specific circumstances and applications.

It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Incremental Generalization of Example Wrapper Trees

FIGS. 5A-D graphically illustrate incremental or interim results of generalizing an example wrapper tree in accordance with example embodiments of the invention, for example using the techniques described above with respect to FIGS. 4A-B. In FIG. 5A, the wrapper tree is shown in a first form 502, which can represent an original DOM (Document Object Model) of the wrapper. FIG. 5B illustrates the wrapper tree in a second form 504 after nested discovery (e.g., top-down nested discovery) has been applied to its first form 502. The wrapper tree in the form 504 or a corresponding tree-based regular expression can for example be the initial template or wrapper tree provided or received in block 402 of FIG. 4A.

FIG. 5C shows the wrapper tree in a form 506 that results when an example process of the present invention (e.g., blocks 406-430 of FIGS. 4A-B) is applied to the wrapper tree form 504 to generalize the TR sub-trees, or in other words, those sub-trees having root nodes labeled TR. As can be seen in FIG. 5C in comparison with FIG. 5B, the sub-trees TD in the left-hand sub-tree TR are consolidated or generalized. Note that an example process of the present invention can first be applied at a lower level to those sub-trees of the TR sub-trees that have root nodes labeled TH, TD and * as shown in FIG. 5B, but as that would result in no change to those sub-trees in this particular case (they cannot be further generalized), it is not shown.

FIG. 5D shows a generalized wrapper tree in a form 508 that results from application of an example process of the invention to the wrapper tree form 506 at the highest level, the level of the root node "Table" of the entire tree. As can be seen in FIG. 5D, the two sub-trees having root nodes TR in form 506 are consolidated or generalized into a single sub-tree in FIG. 5D, thus culminating in the final, reduced or generalized wrapper of FIG. 5D.

Figure 6A:
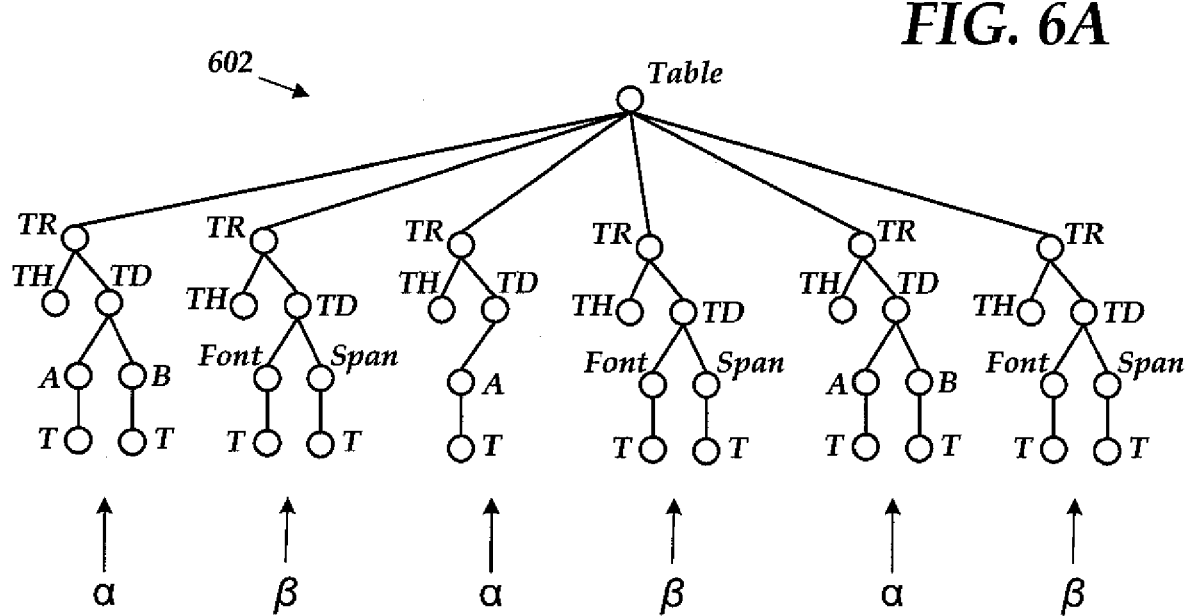
FIGS. 6A-B illustrate example interim results of a process in accordance with the invention.
Figure 6B:
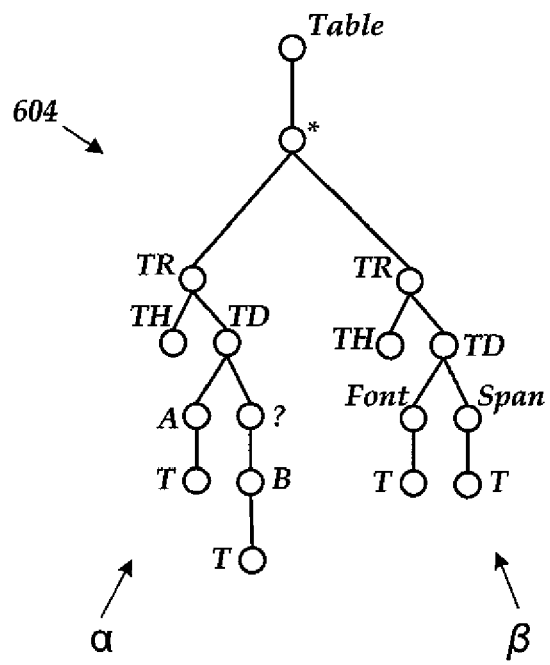

FIGS. 6A-B graphically illustrate clustering and subsequent generalization results at a highest level in an example wrapper tree, in accordance with embodiments of the invention. As shown in FIG. 6A, in a wrapper tree 602 sub-trees having root nodes TR are organized or assigned into two clusters, cluster α and cluster β, and these wrapper sub-trees are in a particular order, αβαβαβ. Thus the letters in this string represent separate wrapper sub-trees (as shown in FIG. 6A), and the letter similarity indicates that sub-trees represented with the same letter fell into the same cluster. This string is generalized to $(αβ)*$, and the corresponding, generalized wrapper tree is shown in FIG. 6B.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A network device configured to manage document templates, comprising:
   a transceiver to send and receive data over a network; and
   a processor that is operative to enable actions for:
      receiving a tree-based regular expression that represents the template;
      below a given level in the tree-based regular expression, performing:
         forming clusters of sub-trees of the tree-based regular expression via a cost measure;
         generating a nested pattern regular expression based on the clusters;
         merging sub-trees based on the nested pattern regular expression;
         replacing sub-trees in the tree-based regular expression at the given level with the merged sub-trees; and
         repeating, for a next higher level of the tree-based regular expression that is closer to a root of the corresponding tree, the actions of forming clusters, generating a nested pattern regular expression, merging sub-trees, and replacing sub-trees in the tree-based regular expression.

2. The network device of claim 1, wherein the generating, merging and replacing comprise:
   forming a string of character symbols, wherein each cluster is uniquely labeled with a character symbol, and instances of character symbols in the string represent sub-trees that are members of the corresponding cluster;
   generating a nested pattern regular expression based on the string;
   mapping the sub-trees to character symbols in the nested pattern regular expression;
   generating a tree from the nested pattern regular expression;
   replacing each character symbol in the generated tree with a merge of the sub-trees that map to the character symbol, to form a generalized regular expression tree; and
   replacing the sub-trees in the tree-based regular expression with the generalized regular expression tree.

3. The network device of claim 1, wherein the cost measure indicates a cost of a node in the tree-based regular expression and the cost is based at least in part on a level of the node in the tree-based regular expression.

4. The network device of claim 1, wherein the cost measure indicates a cost of a node in the tree-based regular expression and the cost of the node increases with a proximity of the node to a root of the tree corresponding to the tree-based regular expression.

5. The network device of claim 1, wherein the forming clusters comprises, for each of the sub-trees:
   determining for each cluster a cost of generalizing the cluster to accommodate the sub-tree;
   associating the sub-tree with a cluster whose cost of generalizing is lowest and below a threshold value; and
   if none of the costs of generalizing are below the threshold value, then forming a new cluster based on the sub-tree.

6. The network device of claim 1, where the electronic document comprises an HTML HyperText Markup Language) page.

7. The network device of claim 1, wherein the received tree-based regular expression is formed via nested pattern discovery that proceeds from root to leaf of the corresponding tree.

8. A method for generalizing a structural template for an electronic document, comprising:
   receiving a tree-based regular expression that represents the template;
   below a given level in the tree-based regular expression, performing:
      forming clusters of sub-trees of the tree-based regular expression via a cost measure;
      generating a nested pattern regular expression based on the clusters;

merging sub-trees based on the nested pattern regular expression;

replacing sub-trees in the tree-based regular expression at the given level with the merged sub-trees; and repeating, for a next higher level of the tree-based regular expression that is closer to a root of the corresponding tree, the actions of forming clusters, generating a nested pattern regular expression, merging sub-trees, and replacing sub-trees in the tree-based regular expression.

9. The method of claim 8, wherein the generating, merging and replacing comprise:

forming a string of character symbols, wherein each cluster is uniquely labeled with a character symbol, and instances of character symbols in the string represent sub-trees that are members of the corresponding cluster;

generating a nested pattern regular expression based on the string;

mapping the sub-trees to character symbols in the nested pattern regular expression;

generating a tree from the nested pattern regular expression;

replacing each character symbol in the generated tree with a merge of the sub-trees that map to the character symbol, to form a generalized regular expression tree; and replacing the sub-trees in the tree-based regular expression with the generalized regular expression tree.

10. The method of claim 8, wherein the cost measure indicates a cost of a node in the tree-based regular expression and the cost is based at least in part on a level of the node in the tree-based regular expression.

11. The method of claim 8, wherein forming clusters comprises, for each of the sub-trees:

determining for each cluster a cost of generalizing the cluster to accommodate the sub-tree;

associating the sub-tree with a cluster whose cost of generalizing is lowest and below a threshold value; and if none of the costs of generalizing are below the threshold value, then forming a new cluster based on the sub-tree.

12. A processor readable medium that includes data and instructions, wherein the execution of the instructions provides for managing a document template by enabling actions, comprising:

receiving a tree-based regular expression that represents the template;

below a given level in the tree-based regular expression, performing:

forming clusters of sub-trees of the tree-based regular expression via a cost measure;

generating a nested pattern regular expression based on the clusters;

merging sub-trees based on the nested pattern regular expression;

replacing sub-trees in the tree-based regular expression at the given level with the merged sub-trees; and repeating, for a next higher level of the tree-based regular expression that is closer to a root of the corresponding tree, the actions of forming clusters, generating a nested pattern regular expression, merging sub-trees, and replacing sub-trees in the tree-based regular expression.

13. The medium of claim 12, wherein the generating, merging and replacing comprise:

forming a string of character symbols, wherein each cluster is uniquely labeled with a character symbol, and instances of character symbols in the string represent sub-trees that are members of the corresponding cluster;

generating a nested pattern regular expression based on the string;

mapping the sub-trees to character symbols in the nested pattern regular expression;

generating a tree from the nested pattern regular expression;

replacing each character symbol in the generated tree with a merge of the sub-trees that map to the character symbol, to form a generalized regular expression tree; and replacing the sub-trees in the tree-based regular expression with the generalized regular expression tree.

14. The processor readable medium of claim 12, wherein the cost measure indicates a cost of a node in the tree-based regular expression and the cost is based at least in part on a level of the node in the tree-based regular expression.

15. The processor readable medium of claim 12, wherein forming clusters comprises, for each of the sub-trees:

determining for each cluster a cost of generalizing the cluster to accommodate the sub-tree;

associating the sub-tree with a cluster whose cost of generalizing is lowest and below a threshold value; and if none of the costs of generalizing are below the threshold value, then forming a new cluster based on the sub-tree.

16. A system that manages document templates, comprising:

a network device that includes:

a transceiver for communicating with at least one mobile device over a network; and processor for enabling actions, comprising:

receiving a tree-based regular expression that represents a document template;

below a given level in the tree-based regular expression, performing:

forming clusters of sub-trees of the tree-based regular expression via a cost measure;

generating a nested pattern regular expression based on the clusters;

merging sub-trees based on the nested pattern regular expression;

replacing sub-trees in the tree-based regular expression at the given level with the merged sub-trees;

repeating, for a next higher level of the tree-based regular expression that is closer to a root of the corresponding tree, the actions of forming clusters, generating a nested pattern regular expression, merging sub-trees, and replacing sub-trees in the tree-based regular expression; and extracting information from a web page based on a document template corresponding to the tree-based regular expression; and the at least one mobile device that further includes:

a transceiver for communicating with at least the network device over the network; and a processor for enabling actions, comprising:

receiving the extracted information.

17. The system of claim 16, wherein:

the generating, merging and replacing comprise:

forming a string of character symbols, wherein each cluster is uniquely labeled with a character symbol, and instances of character symbols in the string represent sub-trees that are members of the corresponding cluster;

generating a nested pattern regular expression based on the string;

mapping the sub-trees to character symbols in the nested pattern regular expression;

generating a tree from the nested pattern regular expression;

replacing each character symbol in the generated tree with a merge of the sub-trees that map to the character symbol, to form a generalized regular expression tree; and replacing the sub-trees in the tree-based regular expression with the generalized regular expression tree; and the forming clusters comprises, for each of the sub-trees:

determining for each cluster a cost of generalizing the cluster to accommodate the sub-tree;

associating the sub-tree with a cluster whose cost of generalizing is lowest and below a threshold value;

and if none of the costs of generalizing are below the threshold value, then forming a new cluster based on the sub-tree.

18. The system of claim 16, wherein:

the cost measure indicates a cost of a node in the tree-based regular expression and the cost is based at least in part on a level of the node in the tree-based regular expression; and the network device comprises a mobile device.

19. A mobile device configured to manage document templates, comprising:

a transceiver to send and receive data over a network; and a processor that is operative to enable actions for:

receiving a tree-based regular expression that represents a document template;

below a given level in the tree-based regular expression, performing:

forming clusters of sub-trees of the tree-based regular expression via a cost measure;

generating a nested pattern regular expression based on the clusters;

merging sub-trees based on the nested pattern regular expression; and replacing sub-trees in the tree-based regular expression at the given level with the merged sub-trees;

repeating, for a next higher level of the tree-based regular expression that is closer to a root of the corresponding tree, the actions of forming clusters, generating a nested pattern regular expression, merging sub-trees, and replacing sub-trees in the tree-based regular expression;

extracting information from a web page based on the document template corresponding to the tree-based regular expression; and displaying the extracted information to a user.

20. The mobile device of claim 19, wherein the generating, merging and replacing comprise:

forming a string of character symbols, wherein each cluster is uniquely labeled with a character symbol, and instances of character symbols in the string represent sub-trees that are members of the corresponding cluster;

generating a nested pattern regular expression based on the string;

mapping the sub-trees to character symbols in the nested pattern regular expression;

generating a tree from the nested pattern regular expression;

replacing each character symbol in the generated tree with a merge of the sub-trees that map to the character symbol, to form a generalized regular expression tree; and replacing the sub-trees in the tree-based regular expression with the generalized regular expression tree; and wherein forming clusters comprises, for each of the sub-trees, determining for each cluster a cost of generalizing the cluster to accommodate the sub-tree, associating the sub-tree with a cluster whose cost of generalizing is lowest and below a threshold value, and if none of the costs of generalizing are below the threshold value, then forming a new cluster based on the sub-tree.

\* \* \* \* \*